US012749705B2

(12) United States Patent
Xiao et al.

(10) Patent No.: US 12,749,705 B2
(45) Date of Patent: Sep. 29, 2026

(54) METHOD TO IMPROVE IONIC CONDUCTIVITY OF A SOLID ELECTROLYTE IN A BATTERY CELL

(71) Applicant: GM GLOBAL TECHNOLOGY OPERATIONS LLC, Detroit, MI (US)

(72) Inventors: Xingcheng Xiao, Troy, MI (US); Robert D. Schmidt, Bloomfield Hills, MI (US); Yifan Zhao, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 681 days.

(21) Appl. No.: 18/330,649

(22) Filed: Jun. 7, 2023

(65) Prior Publication Data

US 2024/0413386 A1 Dec. 12, 2024

(51) Int. Cl.
*H01M 10/0562* (2010.01)

(52) U.S. Cl.
CPC .................. *H01M 10/0562* (2013.01); *H01M 2300/0071* (2013.01)

(58) Field of Classification Search
CPC ..... H01M 10/0562; H01M 2300/0071; H01M 10/052; H01M 10/0525; H01M 50/403; H01M 10/058; H01M 10/4235; H01M 2300/0085; Y02E 60/10
See application file for complete search history.

(56) References Cited

U.S. PATENT DOCUMENTS 11,094,996 B2 8/2021 Xiao
2021/0083249 A1* 3/2021 Xiao ................... H01M 50/449
2026/0121061 A1* 4/2026 Shimada ............... H01M 4/628

* cited by examiner

*Primary Examiner* — Matthew T Martin
*Assistant Examiner* — Bartholomew A Hornsby
(74) *Attorney, Agent, or Firm* — Quinn IP Law

(57) ABSTRACT

A method to create a garnet-based solid electrolyte separator for a battery cell is provided. The method includes coating a garnet-based material powder, initially including a lithium carbonate layer upon an outer surface of the garnet-based material powder, with aluminum fluoride to create a fluoride-treated garnet-based material powder. The method further includes operating a solid-state reaction upon the fluoride-treated garnet-based material powder, such that the aluminum fluoride reacts with the lithium carbonate layer to create aluminum oxide, carbon dioxide, and lithium fluoride. The solid-state reaction creates a fluoride-treated and solid-state reacted garnet-based material powder including the aluminum oxide and the lithium fluoride. The method further includes sintering the fluoride-treated and solid-state reacted garnet-based material powder including the aluminum oxide and the lithium fluoride. The sintering includes applying pressure upon the fluoride-treated and solid-state reacted garnet-based material powder to densify the powder and create the separator.

20 Claims, 2 Drawing Sheets

METHOD TO IMPROVE IONIC CONDUCTIVITY OF A SOLID ELECTROLYTE IN A BATTERY CELL

GOVERNMENT CONTRACT

This application was made with government support under contract no. DOE DE-EE-0008863, awarded by the Department of Energy. The government has certain rights in the invention.

BACKGROUND

The disclosure generally relates to a self-healing solid state battery configuration and to a method of manufacture thereof.

Lithium-ion batteries and lithium metal batteries are desirable candidates for powering electronic devices in the consumer, automotive, and aerospace industries due to their relatively high energy density, high power density, lack of memory effect, and long cycle life, as compared to other rechargeable battery technologies, including lead-acid batteries, nickel-cadmium and nickel-metal-hydride batteries.

A solid-state battery cell includes a solid electrolyte. The solid electrolyte may include a first planar primary surface which abuts and contacts a planar primary surface of an anode electrode. The solid electrolyte may include a second planar primary surface which abuts and contacts a planar primary surface of a cathode electrode.

SUMMARY

A method to create a garnet-based solid electrolyte separator for a battery cell is provided. The method includes coating a garnet-based material powder, initially including a lithium carbonate layer upon an outer surface of the garnet-based material powder, with aluminum fluoride to create a fluoride-treated garnet-based material powder. The method further includes operating a solid-state reaction upon the fluoride-treated garnet-based material powder, such that the aluminum fluoride reacts with the lithium carbonate layer to create aluminum oxide, carbon dioxide, and lithium fluoride. The solid-state reaction creates a fluoride-treated and solid-state reacted garnet-based material powder including the aluminum oxide and the lithium fluoride. The method further includes sintering the fluoride-treated and solid-state reacted garnet-based material powder including the aluminum oxide and the lithium fluoride. The sintering includes applying pressure upon the fluoride-treated and solid-state reacted garnet-based material powder to densify the fluoride-treated and solid-state reacted garnet-based material powder and create the garnet-based solid electrolyte separator.

In some embodiments, the garnet-based material powder includes a lithium lanthanum zirconium oxide (LLZO) powder or a doped LLZO powder including aluminum, gallium, niobium, or tantalum as a dopant.

In some embodiments, the aluminum oxide acts as a dopant to stabilize the LLZO powder or the doped LLZO powder in a cubic phase.

In some embodiments, coating the garnet-based material powder further includes coating the garnet-based material powder with $GaF_3$, $NbF_5$, or $TaF_5$.

In some embodiments, coating the garnet-based material powder includes utilizing atomic layer deposition (ALD), chemical vapor deposition (CVD), physical vapor deposition (PVD), a solution process, or dry powder mixing of the garnet-based material powder with a nano-sized fluoride including $AlF_3$, $GaF_3$, $NbF_3$, or $TaF_5$.

In some embodiments, sintering further includes utilizing the lithium fluoride as a sintering aid, thereby enabling a relatively lower minimum temperature during the sintering.

In some embodiments, sintering further includes applying increasing pressure over time upon the fluoride-treated and solid-state reacted garnet-based material powder.

In some embodiments, operating the solid-state reaction includes heating the fluoride-treated garnet-based material powder to a temperature of not more than 500° C.

In some embodiments, sintering further includes heating the fluoride-treated and solid-state reacted garnet-based material powder to a temperature of 1050° C. for 1 hour under a pressure of 80 megapascals.

In some embodiments, sintering further includes hot-pressing the fluoride-treated and solid-state reacted garnet-based material powder under pressure of at least 10 megapascals into pellets.

In some embodiments, the method further includes, after the sintering, pairing residual lithium carbonate or newly formed, post-sintering lithium carbonate with the lithium fluoride, and create space-charge configured for facilitating lithium-ion diffusion through grain boundaries of the garnet-based solid electrolyte separator.

In some embodiments, the solid electrolyte separator includes grain boundaries including a mixture of LiF and $Li_2CO_3$ or a mixture of LiF and $LiAlO_2$.

According to one alternative embodiment, a method to create a solid electrolyte separator for a battery cell is provided. The method includes creating the solid electrolyte separator, which includes coating an LLZO powder, initially including a lithium carbonate layer upon an outer surface of the LLZO powder, with aluminum fluoride to create a fluoride-treated LLZO powder. Creating the separator further includes operating a solid-state reaction upon the fluoride-treated LLZO powder, such that the aluminum fluoride reacts with the lithium carbonate layer to create aluminum oxide, carbon dioxide, and lithium fluoride. The solid-state reaction creates a fluoride-treated and solid-state reacted LLZO powder including the aluminum oxide and the lithium fluoride. Creating the separator further includes sintering the fluoride-treated and solid-state reacted LLZO powder including the aluminum oxide and the lithium fluoride. The sintering includes applying pressure upon the fluoride-treated and solid-state reacted LLZO powder to densify the fluoride-treated and solid-state reacted LLZO powder and create the solid electrolyte separator. The method further includes creating the battery cell including disposing an anode and a cathode within an external case and disposing the solid electrolyte separator between and in contact with the anode and the cathode. The aluminum oxide acts as a dopant to stabilize the LLZO powder in a cubic phase.

In some embodiments, coating the LLZO powder further includes coating the LLZO powder with GaF3, NbF5, or TaF5.

In some embodiments, sintering further includes utilizing the lithium fluoride as a sintering aid, thereby enabling a relatively lower minimum temperature during the sintering.

In some embodiments, sintering further includes applying increasing pressure over time upon the fluoride-treated and solid-state reacted LLZO powder.

In some embodiments, operating the solid-state reaction includes heating the fluoride-treated LLZO powder to a temperature of not more than 500° C.

In some embodiments, sintering further includes heating the fluoride-treated and solid-state reacted LLZO powder to a temperature of 1050° C. for 1 hour under a pressure of 80 megapascals.

In some embodiments, sintering further includes hot-pressing the fluoride-treated and solid-state reacted LLZO powder under pressure of at least 10 megapascals into pellets.

According to one alternative embodiment, a solid electrolyte separator for use in a battery cell is provided. The solid electrolyte separator includes the solid electrolyte separator created by coating a garnet-based material powder, initially including a lithium carbonate layer upon an outer surface of the garnet-based material powder, with aluminum fluoride to create a fluoride-treated garnet-based material powder. The solid electrolyte separator is further created by operating a solid-state reaction upon the fluoride-treated garnet-based material powder, such that the aluminum fluoride reacts with the lithium carbonate layer to create aluminum oxide, carbon dioxide, and lithium fluoride. The solid-state reaction creates a fluoride-treated and solid-state reacted garnet-based material powder including the aluminum oxide and the lithium fluoride. The solid electrolyte separator is further created by sintering the fluoride-treated and solid-state reacted garnet-based material powder including the aluminum oxide and the lithium fluoride. The sintering includes applying pressure upon the fluoride-treated and solid-state reacted garnet-based material powder to densify the fluoride-treated and solid-state reacted garnet-based material powder and create the solid electrolyte separator.

The above features and advantages and other features and advantages of the present disclosure are readily apparent from the following detailed description of the best modes for carrying out the disclosure when taken in connection with the accompanying drawings.

DETAILED DESCRIPTION

Figure 1:
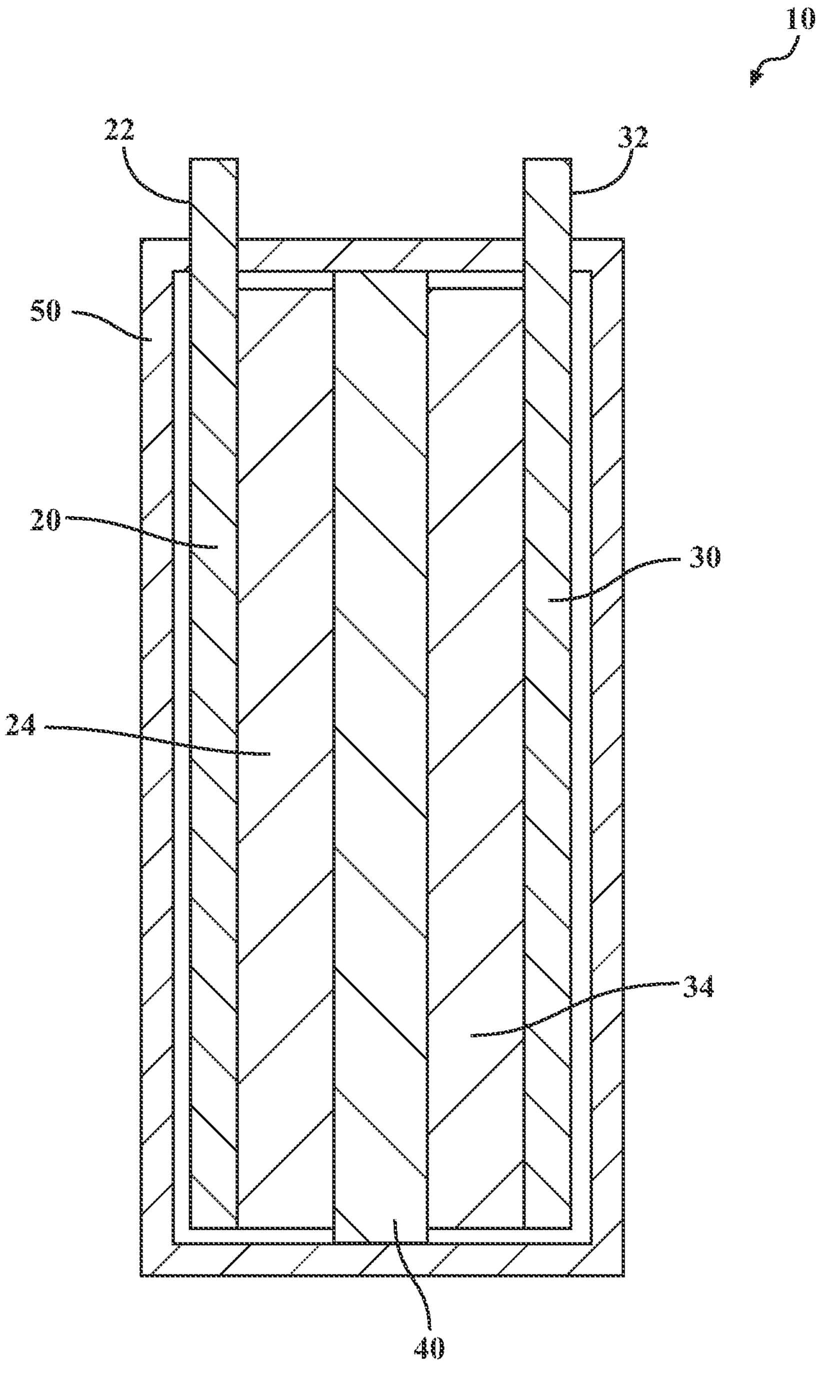
FIG. 1 schematically illustrates in side sectional view an exemplary battery cell including an anode, a cathode, and a solid electrolyte separator, in accordance with the present disclosure.

A battery system may include one or more solid-state battery cells. A solid-state battery cell may include an anode electrode, a cathode electrode, and a solid electrolyte.

A solid-state battery includes a solid electrolyte, which provides for or facilitates ion transfer between the anode electrode and the cathode electrode. The solid electrolyte further acts as a physical separator between the anode electrode and the cathode electrode, thereby preventing internal short circuits within the battery.

Solid-state batteries may face challenges. Solid-state batteries include stresses at the interface caused by volume changes of anode and cathode during the charging and discharging processes. As the various layers of the battery cell cycle between charging and discharging cycles, contact area between the layers may be lost due to mismatches between the mechanical properties of neighboring layers. Interfacial delamination may additionally result. Electrode stack pressure sandwiching the layers together may mitigate the interfacial delamination between the solid electrolyte (SE) separator layer and electrodes, but it is more difficult to recover the loss of contact perpendicular the pressure direction in the cathode.

Lithium lanthanum zirconium oxide ($Li_7La_3Zr_2O_{12}$ or LLZO) is a promising candidate for solid electrolyte due to its high ionic conductivity and chemical stability to lithium (Li) metal. LLZO is one example of a garnet-based oxide solid electrolyte.

LLZO is sensitive to moisture and air, and easily forms a layer of lithium carbonate ($Li_2CO_3$) upon the surface of LLZO particles, which compromises the ionic conductivity of the LLZO. High interfacial impedance is induced by the layer of $Li_2CO_3$ formed on the LLZO surface. LLZO is reactive with moisture in ambient air in minutes, thereby resulting in formation of the $Li_2CO_3$ passivation layer.

LLZO has two phases. A high temperature, cubic phase exhibits two orders of magnitude higher ionic conductivity than a tetragonal phase. The cubic phase may be unstable at relatively lower temperatures, for example, room temperature. A dopant, aluminum oxide ($Al_2O_3$), for example, may be useful to stabilize the high temperature, cubic phase and provide use of the higher ionic conductivity at relatively lower temperatures.

Processes in the art include mixing $Al_2O_3$ powder with LLZO and at high temperature, utilizing a solid-state reaction for doping, pressing the reacted LLZO into pellets, pre-sintering the pellets to remove lithium carbonate prior to sintering, and sintering the pellets at temperatures above 1000° C. This process used in the art is time consuming and expensive.

A method is provided to remove lithium carbonate formed on garnet based solid electrolytes (such as LLZO) at a relatively low temperature and dope aluminum into LLZO to stabilize the cubic phase. Other dopants may include gallium, niobium, or tantalum. Further, a sintering aid is utilized to accelerate the sintering process of LLZO and enhance the ionic conductivity of LLZO. In the disclosed method, aluminum fluoride and other fluorides (e.g., $GaF_3$, $NbF_5$, and/or $TaF_5$) may be deposited on LLZO particle surfaces through atomic layer deposition, vapor deposition, mixing commercial aluminum fluoride nanoparticles with LLZO powder, or a wet chemistry process. A thickness of a layer of fluorides applied to the LLZO may depend upon a thickness or quantity of the lithium carbonate present. The fluoride coating is hydrophobic which can avoid LLZO reacting with moisture in the air. The fluoride-treated LLZO is then put through a solid-state reaction and then sintered.

The disclosed method may be described as including two steps. First, the method includes preparing fluoride-treated LLZO and utilizing a solid-state reaction to remove lithium carbonate from the LLZO. The solid-state reaction may be operated at a relatively low temperature, for example, at less than 500° C. The solid-state reaction further creates aluminum oxide to stabilize the cubic phase of the LLZO and lithium fluoride (LiF) as a sintering aid.

LLZO, in a sample of particles, may exist in a plurality of phases. LLZO may be formed from precursor materials through a calcining process. Depending upon the temperature of the calcining process or subsequent processes, the LLZO sample may include some or an entirety of cubic phase LLZO particles. The LLZO, when it cools from the higher temperatures, may naturally transition away from the cubic phase. Modifiers such as an aluminum dopant, which is present in accordance with the present disclosure, may increase a proportion of the LLZO particles that remain in the cubic phase.

Second, the method includes sintering the fluoride-treated and solid-state reacted LLZO including the aluminum oxide and the lithium fluoride at a relatively high temperature. The sintering step may include heating the fluoride-treated and solid-state reacted LLZO to a minimum temperature of 1050° C. for 1 hour at 80 megapascals (MPa). A minimum temperature of the sintering process may be reduced through presence of a sintering aid such as LiF. During the sintering process, pressure may be gradually increased to densify a resulting solid electrolyte.

Depending upon presence and quantity of hydrophobic fluoride present, additional lithium carbonate may be formed after the sintering process during a subsequent handling process. This post-sintering lithium carbonate is paired with LiF and forms space-charge which may facilitate Li-ion diffusion through grain boundaries in the solid electrolyte.

A chemical formula for the solid-state reaction may be described by Formula 1 as follows $$2AlF_3+3Li_2CO_3 \rightarrow Al_2(CO_3)_3+6LiF \rightarrow Al_2O_3+3CO_2+6LiF \quad [1]$$

Aluminum fluoride and lithium carbonate react to form aluminum carbonate and lithium fluoride. The aluminum carbonate subsequently breaks down to form aluminum oxide and carbon dioxide. The aluminum carbonate present upon the fluoride-treated and solid-state reacted LLZO acts as a dopant to stabilize the LLZO in a cubic phase. In addition, the $Al_2O_3$ may react with lithium to create $LiAlO_2$. The lithium fluoride present upon the fluoride-treated and solid-state reacted LLZO acts as a sintering aid in the subsequent sintering method step.

As part of the sintering method step, a hot-press process is utilized to densify the powder into pellets. In one embodiment, the hot-press process may employ pressures in excess of 10 megapascals (MPa) for densification. At the conclusion of the sintering method step, the pellets may be cooled down slowly to retain the cubic phase of the LLZO. The finished product may include grain boundaries including a mixture of LiF and $Li_2CO_3$ and/or LiF and $LiAlO_2$.

A number of processes are envisioned for transforming post-sintering powder, disclosed herein, into a solid electrolyte separator. In one exemplary embodiment, a two-step process includes, in a first step, a heat treatment of the post-sintering powder. LLZO powder is cold pressed into pellets at 80 MPa in a 2.54 centimeter diameter stainless steel die. The cold pressed pellets were placed on a magnesium oxide (MgO) crucible in tube furnace under argon and oxygen. The cold pressed pellets were calcined at 450° C. for 4 hours and then at 850° C. for 4 hours. After calcination, the pellets are crushed with an agate mortar and pestle in a glovebox. In a second step, the resulting powder from the first step is processed with rapid induction hot-pressing. Al-LLZO powder and/or $AlF_3$-LLZO powder are hot-pressed at 1050° C. under a constant pressure of 80 MPa for 1 hour using rapid induction hot-pressing (RIHP) in flowing argon. After RIHP, each billet was sliced into pellets using a diamond saw. The pellets were mounted on a lapping fixture with crystal bond wax and ground on sandpaper from ranging from 500 grit to 2500 grit in glovebox. This resulting product may be formed into a solid electrolyte separator.

According to one alternative embodiment, a battery cell including an LLZO solid electrolyte separator created according to the disclosed method is provided. In another embodiment, a device, including an exemplary vehicle, boat, airplane, power generation system, or piece of construction equipment, including a battery cell including an LLZO solid electrolyte separator created according to the disclosed method is provided.

Methods and processes described herein describe steps performed upon LLZO material in preparation for using the LLZO as the primary material in a solid electrolyte separator in a battery cell. Similar methods and processes may be utilized with other garnet-type materials for use as a solid electrolyte separator. Where an LLZO powder is described, a garnet-based material powder may alternatively be described.

FIG. 1 schematically illustrates in side sectional view an exemplary battery cell including a battery cell 10 including an anode 20, a cathode 30, and a solid electrolyte separator 40. The anode 20 includes a current collector 22 and an anode electrode 24. The cathode 30 includes a current collector 32 and a cathode electrode 34. The solid electrolyte separator 40 is constructed with a garnet-based material, such as LLZO, according to the method disclosed herein. The anode 20 and the cathode 30 are disposed within an external case 50. The solid electrolyte separator 40 is disposed between the anode 20 and the cathode 30. The solid electrolyte separator 40 provides physical separation of the anode 20 from the cathode 30. The solid electrolyte separator 40 further facilitates ion transfer between the anode 20 and the cathode 30. The disclosed method for creating the solid electrolyte separator 40 provides excellent ionic conductivity for the battery cell 10. In some embodiments, the ionic conductivity of the battery cell 10 may be an order of magnitude better than a similar battery cell created by methods used in the art.

The battery cell 10 is exemplary. The disclosed solid electrolyte separator 40 may be used in a variety of battery cells 10 including prismatic can battery cells, cylindrical battery cells, jelly roll electrode battery cells, and coin battery cells.

Figure 2:
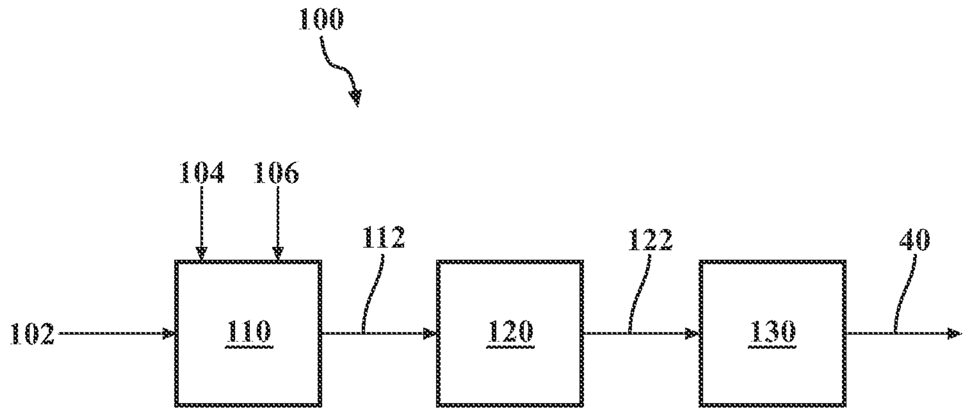
FIG. 2 schematically illustrates a manufacturing process to create the solid electrolyte separator of FIG. 1, in accordance with the present disclosure.

FIG. 2 schematically illustrates a manufacturing process 100 to create the solid electrolyte separator 40 of FIG. 1. A coating operation 110 is illustrated, wherein a garnet-based material powder including an exemplary LLZO powder 102 is provided as a first input material. Second and third input materials are illustrated as aluminum fluoride 104 and a second fluoride 106. The second fluoride may include $GaF_3$, $NbF_5$, and/or $TaF_5$. The coating operation 110 may include atomic layer deposition, vapor deposition, mixing commercial aluminum fluoride nanoparticles with LLZO powder, or a wet chemistry process. The coating operation 110 provides an output flow of fluoride-treated LLZO powder 112. A solid-state reaction operation 120 is illustrated receiving the fluoride-treated LLZO powder 112. The fluoride-treated LLZO powder 112 is heated to a temperature not exceeding 500° C., and the chemical reaction of Formula 1 is operated. The solid-state reaction operation 120 provides an output flow of fluoride-treated and solid-state reacted LLZO powder 122 including the aluminum oxide and the lithium fluoride. A sintering operation 130 is illustrated, receiving the fluoride-treated and solid-state reacted LLZO powder 122 including the aluminum oxide and the lithium fluoride. The fluoride-treated and solid-state reacted LLZO powder 122 including the aluminum oxide and the lithium fluoride is sintered at a temperature of at least a minimum temperature of the sintering operation 130. Further pressure is applied to the fluoride-treated and solid-state reacted LLZO powder 122 including the aluminum oxide and the lithium fluoride through the sintering process. The sintering operation 130 permits the sintered material to cool at a relatively slow rate. The sintering operation 130 provides the solid electrolyte separator 40 or material useful to create the solid electrolyte separator 40 as an output. The manufacturing process 100 is exemplary. A number of additional and/or alternative operations are envisioned, and the disclosure is not intended to be limited to the examples provided herein.

Figure 3:
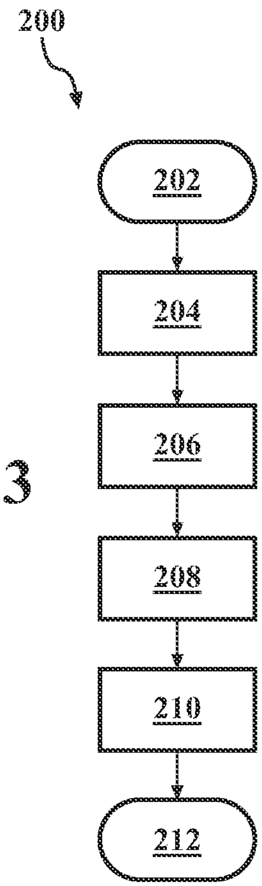
FIG. 3 is a flowchart illustrating a method to create the solid electrolyte separator of FIG. 1, in accordance with the present disclosure.

FIG. 3 is a flowchart illustrating a method 200 to create the solid electrolyte separator 40 of FIG. 1. The method 200 starts at step 202. At step 204, a garnet-based material powder is coated with aluminum fluoride and one or more additional fluorides to create a fluoride-treated garnet-based material powder. As described herein, the garnet-based material powder initially includes a lithium carbonate passivation layer upon an outer surface of the garnet-based material powder resulting from air reacting with the garnet-based material powder. At step 206, a solid-state reaction is operated upon the fluoride-treated garnet-based material powder. The aluminum fluoride reacts with the lithium carbonate layer to create aluminum oxide, carbon dioxide, and lithium fluoride. As a result of the step 206, a fluoride-treated and solid-state reacted garnet-based material powder including the aluminum oxide and the lithium fluoride is created. At step 208, the fluoride-treated and solid-state reacted garnet-based material powder including the aluminum oxide and the lithium fluoride is sintered. The sintering includes applying pressure upon the fluoride-treated and solid-state reacted garnet-based material powder to densify the fluoride-treated. At step 210, the sintered material powder is utilized to create the garnet-based solid electrolyte separator. At step 212, the method 200 ends. The method 200 is provided as an exemplary method to create the solid electrolyte separator 40. A number of additional and/or alternative method steps are envisioned, and the disclosure is not intended to be limited to the examples provided herein.

Figure 4:
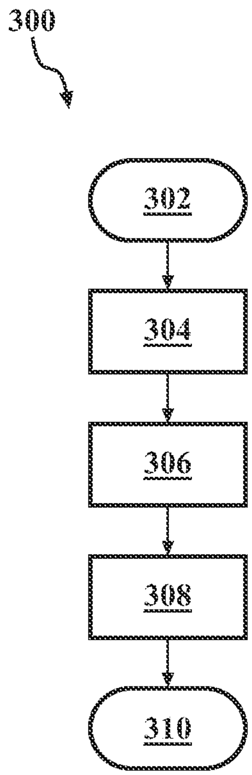
FIG. 4 is a flowchart illustrating a method to create the battery cell of FIG. 1 including the solid electrolyte separator, in accordance with the present disclosure.

FIG. 4 is a flowchart illustrating a method 300 to create the battery cell 10 of FIG. 1 including the solid electrolyte separator 40. The method 300 starts at step 302. At step 304, the solid electrolyte separator 40 is created according to the method 200 of FIG. 3. At step 306, the electrolyte separator 40 is disposed between the anode 20 and the cathode 30 of FIG. 1. At step 308, the anode 20, the solid electrolyte separator 40, and the cathode 30 are disposed into the external case 50 of the battery cell 10. At step 310, the method 300 ends. The method 300 is provided as an exemplary method to create the battery cell 10 of FIG. 1. A number of additional and/or alternative method steps are envisioned, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A method to create a garnet-based solid electrolyte separator for a battery cell, the method comprising:

coating a garnet-based material powder, initially including a lithium carbonate layer upon an outer surface of the garnet-based material powder, with aluminum fluoride to create a fluoride-treated garnet-based material powder;

operating a solid-state reaction upon the fluoride-treated garnet-based material powder, such that the aluminum fluoride reacts with the lithium carbonate layer to create aluminum oxide, carbon dioxide, and lithium fluoride, wherein the solid-state reaction creates a fluoride-treated and solid-state reacted garnet-based material powder including the aluminum oxide and the lithium fluoride; and sintering the fluoride-treated and solid-state reacted garnet-based material powder including the aluminum oxide and the lithium fluoride, wherein the sintering includes applying pressure upon the fluoride-treated and solid-state reacted garnet-based material powder to densify the fluoride-treated and solid-state reacted garnet-based material powder and create the garnet-based solid electrolyte separator.

2. The method of claim 1, wherein the garnet-based material powder includes a lithium lanthanum zirconium oxide (LLZO) powder or a doped LLZO powder including aluminum, gallium, niobium, or tantalum as a dopant.

3. The method of claim 1, wherein the aluminum oxide acts as a dopant to stabilize the LLZO powder or the doped LLZO powder in a cubic phase.

4. The method of claim 1, wherein coating the garnet-based material powder further includes coating the garnet-based material powder with $GaF_3$, $NbF_5$, or $TaF_5$.

5. The method of claim 1, where coating the garnet-based material powder includes utilizing atomic layer deposition (ALD), chemical vapor deposition (CVD), physical vapor deposition (PVD), a solution process, or dry powder mixing of the garnet-based material powder with a nano-sized fluoride including $AlF_3$, $GaF_3$, $NbF_3$, or $TaF_5$.

6. The method of claim 1, wherein sintering further includes utilizing the lithium fluoride as a sintering aid, thereby enabling a relatively lower minimum temperature during the sintering.

7. The method of claim 1, wherein sintering further includes applying increasing pressure over time upon the fluoride-treated and solid-state reacted garnet-based material powder.

8. The method of claim 1, wherein operating the solid-state reaction includes heating the fluoride-treated garnet-based material powder to a temperature of not more than 500° C.

9. The method of claim 1, wherein sintering further includes heating the fluoride-treated and solid-state reacted garnet-based material powder to a temperature of 1050° C. for 1 hour under a pressure of 80 megapascals.

10. The method of claim 1, wherein sintering further includes hot-pressing the fluoride-treated and solid-state reacted garnet-based material powder under pressure of at least 10 megapascals into pellets.

11. The method of claim 1, further comprising, after the sintering, pairing residual lithium carbonate or newly formed, post-sintering lithium carbonate with the lithium fluoride, and create space-charge configured for facilitating lithium-ion diffusion through grain boundaries of the garnet-based solid electrolyte separator.

12. The method of claim 1, wherein the solid electrolyte separator includes grain boundaries including a mixture of LiF and $Li_2CO_3$ or a mixture of LiF and $LiAlO_2$.

13. A method to create a solid electrolyte separator for a battery cell, the method comprising:

creating the solid electrolyte separator, including:

coating an LLZO powder, initially including a lithium carbonate layer upon an outer surface of the LLZO powder, with aluminum fluoride to create a fluoride-treated LLZO powder;

operating a solid-state reaction upon the fluoride-treated LLZO powder, such that the aluminum fluoride reacts with the lithium carbonate layer to create aluminum oxide, carbon dioxide, and lithium fluoride, wherein the solid-state reaction creates a fluoride-treated and solid-state reacted LLZO powder including the aluminum oxide and the lithium fluoride; and sintering the fluoride-treated and solid-state reacted LLZO powder including the aluminum oxide and the lithium fluoride, wherein the sintering includes applying pressure upon the fluoride-treated and solid-state reacted LLZO powder to densify the fluoride-treated and solid-state reacted LLZO powder and create the solid electrolyte separator; and creating the battery cell including:

disposing an anode and a cathode within an external case; and disposing the solid electrolyte separator between and in contact with the anode and the cathode; and wherein the aluminum oxide acts as a dopant to stabilize the LLZO powder in a cubic phase.

14. The method of claim 13, wherein coating the LLZO powder further includes coating the LLZO powder with $GaF_3$, $NbF_5$, or $TaF_5$.

15. The method of claim 13, wherein sintering further includes utilizing the lithium fluoride as a sintering aid, thereby enabling a relatively lower minimum temperature during the sintering.

16. The method of claim 13, wherein sintering further includes applying increasing pressure over time upon the fluoride-treated and solid-state reacted LLZO powder.

17. The method of claim 13, wherein operating the solid-state reaction includes heating the fluoride-treated LLZO powder to a temperature of not more than 500° C.

18. The method of claim 13, wherein sintering further includes heating the fluoride-treated and solid-state reacted LLZO powder to a temperature of 1050° C. for 1 hour under a pressure of 80 megapascals.

19. The method of claim 13, wherein sintering further includes hot-pressing the fluoride-treated and solid-state reacted LLZO powder under pressure of at least 10 megapascals into pellets.

20. A solid electrolyte separator for use in a battery cell, comprising:

the solid electrolyte separator created by:

coating a garnet-based material powder, initially including a lithium carbonate layer upon an outer surface of the garnet-based material powder, with aluminum fluoride to create a fluoride-treated garnet-based material powder;

operating a solid-state reaction upon the fluoride-treated garnet-based material powder, such that the aluminum fluoride reacts with the lithium carbonate layer to create aluminum oxide, carbon dioxide, and lithium fluoride, wherein the solid-state reaction creates a fluoride-treated and solid-state reacted garnet-based material powder including the aluminum oxide and the lithium fluoride; and sintering the fluoride-treated and solid-state reacted garnet-based material powder including the aluminum oxide and the lithium fluoride, wherein the sintering includes applying pressure upon the fluoride-treated and solid-state reacted garnet-based material powder to densify the fluoride-treated and solid-state reacted garnet-based material powder and create the solid electrolyte separator.

* * * * *